US008863111B2

(12) United States Patent
Selitser et al.

(10) Patent No.: US 8,863,111 B2
(45) Date of Patent: Oct. 14, 2014

(54) SYSTEM AND METHOD FOR PROVIDING A PRODUCTION UPGRADE OF COMPONENTS WITHIN A MULTIPROTOCOL GATEWAY

(75) Inventors: Boris Selitser, Castro Valley, CA (US); Daniel Jansson, San Francisco, CA (US); Sharath Rajasekar, San Jose, CA (US); Niklas Modin, Oakland, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1207 days.

(21) Appl. No.: 12/493,083

(22) Filed: Jun. 26, 2009

(65) Prior Publication Data

US 2010/0330971 A1 Dec. 30, 2010

(51) Int. Cl.
*G06F 9/44* (2006.01)
*H04L 29/08* (2006.01)
*H04L 12/24* (2006.01)

(52) U.S. Cl.
CPC ............ *H04L 41/5041* (2013.01); *H04L 67/34* (2013.01)
USPC .......................................... 717/170; 717/120

(58) Field of Classification Search
CPC ........... G06F 8/67; G06F 8/36; G06F 9/4435; G06F 9/465
USPC .......................................... 717/17, 170, 120
See application file for complete search history.

(56) References Cited

U.S. PATENT DOCUMENTS

| | | | | |
|---|---|---|---|---|
| 7,266,816 | B1 * | 9/2007 | Sharma et al. | 717/170 |
| 2004/0168153 | A1 * | 8/2004 | Marvin | 717/120 |
| 2004/0172618 | A1 * | 9/2004 | Marvin | 717/116 |
| 2008/0301231 | A1 * | 12/2008 | Mehta et al. | 709/204 |
| 2009/0300093 | A1 * | 12/2009 | Griffiths et al. | 709/202 |

* cited by examiner

*Primary Examiner* — Li B Zhen
*Assistant Examiner* — Duy Khuong Nguyen
(74) *Attorney, Agent, or Firm* — Meyer IP Law Group

(57) ABSTRACT

A production upgrade is described for a multiprotocol gateway. This upgrade allows various modules and components within the gateway to be upgraded independently without impacting traffic flow in the gateway. The upgrade can be performed by deploying a new version of the module alongside an older version of the same module. New client requests can then be directed to the new version, while requests requiring the older module can be continued to be serviced by the prior version. A distinction is made between stateless and stateful conversation during the upgrade of various components. For stateful conversations, request traffic can be versioned according to the session to which each request belongs. A highly available state storage scheme allows new versions of the module to consume state information used by the older versions. For stateless conversations, all new requests can be immediately routed to the new version of the module.

19 Claims, 6 Drawing Sheets

SYSTEM AND METHOD FOR PROVIDING A PRODUCTION UPGRADE OF COMPONENTS WITHIN A MULTIPROTOCOL GATEWAY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to telecommunications and more particularly to dynamic upgrading and modifying processing components within a multiprotocol gateway.

BACKGROUND

Given the recent dramatic growth in wireless and cellular communications, more and more businesses and other entities are integrating themselves with mobile device technologies. In addition to standard voice features, modern cellular phones and similar devices provide countless other services, such as internet access, email, short messaging service (SMS) texting, digital cameras, multimedia messaging service (MMS), Bluetooth, gaming, various web-based applications and the like. As a result, telecommunication carriers and network operators have been under increased pressure to provide more and more service offerings to their subscribers. Today's network operator wants to attract new and retain customers, develop profitable new business models, improve returns and launch new services as quickly as possible. In addition, the possible competitive pressures from other entities such as internet-based providers have been a growing area of concern in this field.

Faced with these challenges, most operators expect a drastic increase in their portfolio of content and application offerings, from a handful now, to thousands and possibly even millions in the future. While some of these offerings will be developed and deployed in house, the vast majority of these new applications will likely be sourced from partners, Web applications such as social networking sites and third party service providers. These outsourced services will be deployed and executed outside of the carrier's internal network, thereby creating new challenges in security, integration and management of the environment.

To assist with these challenges, new multiprotocol gateways and other software applications have emerged, which are typically deployed by the network operator as part of a service development platform (SDP). These gateways usually provide features for managing the ecosystem between the operator, its internal subscriber network and various third party providers. For example, a communication services gateway may help to secure third party access to the operator's core network, provide service level agreement (SLA) enforcement, as well as perform numerous other functions.

While such gateways have done much to improve the telecommunication service environment, there still exists significant room for advancement in terms of better scalability, responsiveness to ever changing customer demands and the deployment of new services and offerings. As a simple example, the gateway may need to be frequently upgraded with new features and functionality. However, it is generally undesirable to take the gateway offline since it is likely to be processing subscriber communications at all times. As such, it would be desirable to provide a more dynamic upgrade process for various components, while taking into account all of the specific requirements of the telecommunication services environment. Applicants have identified the foregoing as well as other needs that currently exist in the art in coming to conceive the subject matter of the present disclosure.

SUMMARY OF THE INVENTION

A production upgrade is described for a multiprotocol gateway. This upgrade allows various modules and components within the gateway to be upgraded independently without impacting traffic flow in the gateway. This upgrade can be performed by deploying a new version of the module alongside an older version of the same module. New client requests can then be directed to the new version, while requests requiring the older module can be continued to be serviced by the prior version.

During the upgrade, a distinction can be made between stateless and stateful conversations. For stateful conversations, request traffic can be versioned according to the session to which each request belongs. As such, the older version of a component can finish processing requests associated with existing sessions without creating anymore new sessions, while the newer version of the component can create new versions for new requests which do not have any session associated with them. A highly available state storage scheme allows new versions of the module to consume state information used by the older versions. For stateless conversations, all new requests can be immediately routed to the new version of the module since sessions may not be maintained.

DETAILED DESCRIPTION

Figure 1:
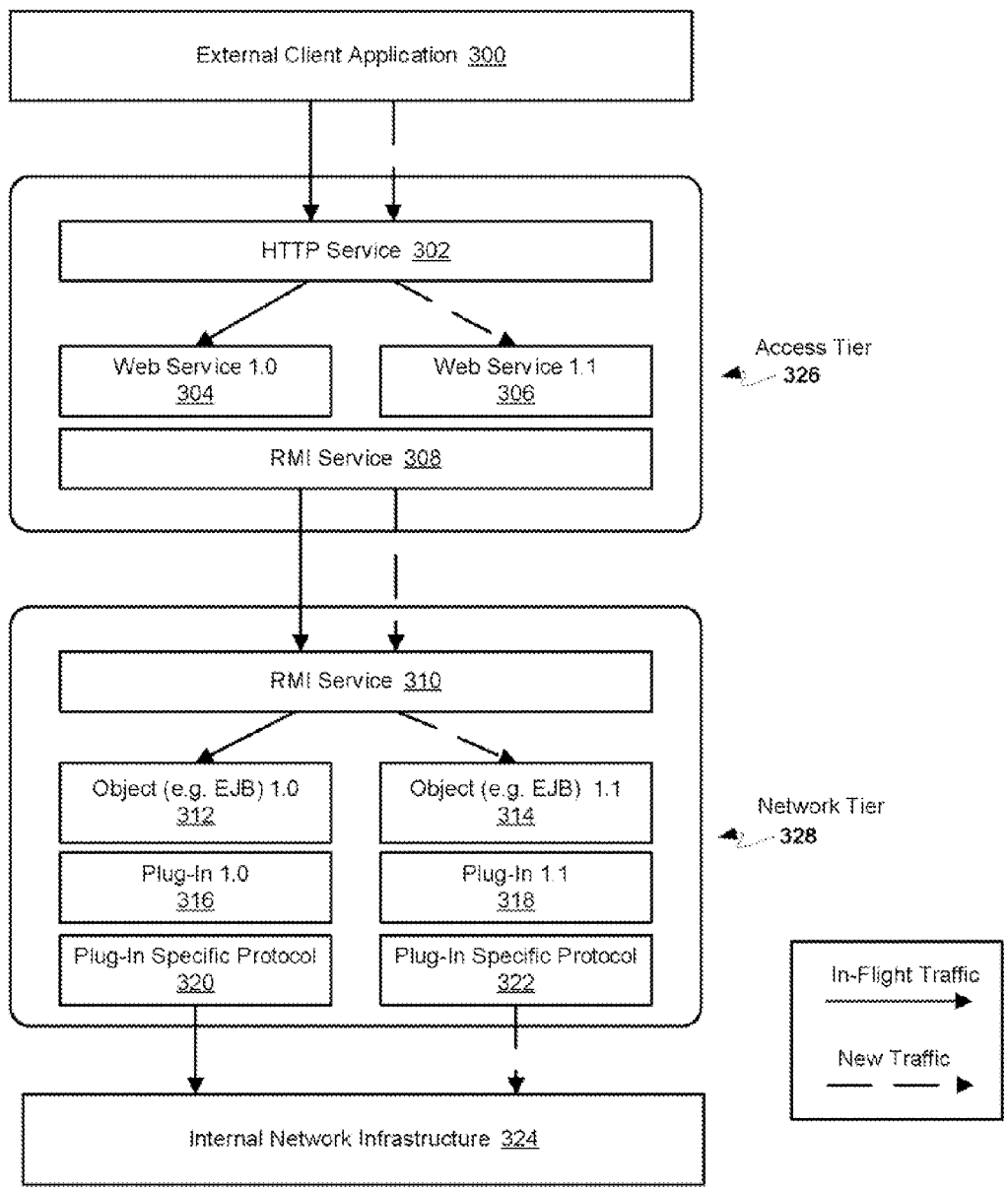
FIG. 1 is an illustration of southbound traffic during a hitless upgrade within the multiprotocol gateway, in accordance with various embodiments of the invention.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device/appliance such as a server or a router. Furthermore, it can also be apparent to those skilled in the art that such components, regardless of how they are combined or divided, can execute on the same computing device or can be distributed among different computing devices connected by one or more networks or other suitable communication means.

In accordance with the embodiments of the invention, systems and methods are described for providing a production upgrade of various components and modules within a multiprotocol gateway. In this manner, the functionality of the gateway can be modified, upgraded or removed without having to shut down the gateway and without losing or affecting any in flight traffic at runtime. As an example, exposure services (individual traffic paths) within the gateway can be deployed, re-deployed and un-deployed while running traffic through the system.

The hitless upgrade can be accomplished by deploying a new version of a particular module alongside an older (previous) version of the same module. For example, this can be performed by deploying a separate archive file (e.g. EAR file) for the new module. New requests can then be directed toward the new module version, while requests requiring the old version can continue to be serviced by the older module. As such, for at least a period of time, there exist two versions of the same module (processing component) on the system.

In various embodiments, stateless and stateful interactions can be serviced differently during the upgrade process. For example, if the new request is a stateless interaction (i.e. does not require any session state to be maintained), the request can be simply routed to the new version of the component. The older version can then simply complete its current processing and return any owed responses before being un-deployed. On the other hand, if the new request is a stateful interaction that is associated with an existing session, it can be directed to the older version of the component. Stateful requests that are associated with new sessions can be directed to the new version of the component. In one embodiment, this is accomplished through versioning of traffic. For example, hypertext transfer protocol (HTTP) traffic is implicitly associated with a specific web application archive (WAR) module version (this could also be an entry point for an enclosing EAR) based on the HTTP session to which it belongs. As such, traffic for existing HTTP sessions is associated with an older module version, while traffic for new sessions can be mapped to the new version of the module. For sessions which are substantially larger in scope or longer in duration that HTTP sessions, it may be desirable to treat the communications as stateless, thus routing all new requests to the newer version of the module and only finishing in-progress requests by the older version.

In order to make the production upgrade process truly hitless, it is also desirable that state information associated with prior versions of the module can be consumed by the new version of the module. As such, a schema is provided, which defines the structure of the state information. The schema can be packaged and deployed separately from the exposure service module that may access it. Since the various modules may be relying on the schema, in one embodiment, the only schema change that is allowed is introducing new attributes, which are nullable. In that case, the new version of the module should be capable of handling instances of storage state with both null and non-null new attribute values. During the hitless deployment, shared storage state can be updated by both new and old versions of the module and thus older modules may overwrite changes to new attributes introduced by the newer versions. Accordingly, the shared storage state should be kept consistent for all running versions.

In various embodiments, any processing component or module within the multiprotocol gateway can be hitlessly upgraded. In the preferred embodiment, the upgradable modules are individual traffic paths (exposure services) that are comprised of an access tier archive file and a network tier archive file. Each archive file can be a separate Java application and hitless upgrade can be supported for both access tier and network tier modules. The network tier and the access tier of the multiprotocol gateway will be described in further detail in relation with FIG. 6 later in this document.

In one embodiment, during an upgrade of an archive file, all of the enclosed plug-ins will complete the traffic they are processing gracefully. Thus, each plug-in gracefully transitions to an ADMIN state as part of server lifecycle or during an upgrade of the enclosing archive file. In various embodiments, plug-ins are resource adapters that are responsible for translating requests to/from a particular network-specific protocol.

In one embodiment, during the hitless upgrade process, any service level agreements (SLAs) are enforced accurately across multiple plug-in versions. Event channels are consumed by all running versions and shared state is kept consistent across the multiple versions. In this manner, the upgrade process can be performed without losing or adversely affecting any in-flight traffic.

The hitless upgrade feature and the multiprotocol gateway in general will now be described in more detail, along with the illustrated figures. It should be noted, however, that the figures are provided for purposes of illustration and that not all of the details illustrated in these figures are required or necessary for the invention.

FIG. 1 is an illustration of southbound traffic during a hitless upgrade within the multiprotocol gateway, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated in FIG. 1, the solid arrow lines represent in-flight traffic flow at the time of hitless deployment, while the broken lines represent new incoming traffic after the new version of the modules have been deployed. In this figure, the requests are shown as originating with the service provider application 300 and are directed to the internal subscriber network 324 of the telecommunications operator. For such southbound traffic, the requests are first received at the access tier 326 of the gateway deployment at the HTTP web service interface 302. In one embodiment, the access tier is truly stateless and thus all new requests can be routed to the newer version of the web service module 1.1 (306). The older module 1.0 (304) can merely complete any in-flight traffic before being un-deployed.

The communication between the access tier and the network tier can be implemented via a remote method invocation (RMI) service 308, 310. Within the network tier 328, there can be multiple versions of the various modules existing contemporaneously. For example, a new version of an object (such as an Enterprise Java Bean EJB) 1.1 314 can be deployed alongside an older version of the object 1.0 312.

The upgradable modules can also include various plug-ins which translate the application invocations to a network specific protocol 320, 322. Accordingly, there can be multiple versions of a plug-in (plug-in version 1.0 316 and plug-in version 1.1 318) existing contemporaneously in the network tier.

Figure 2:
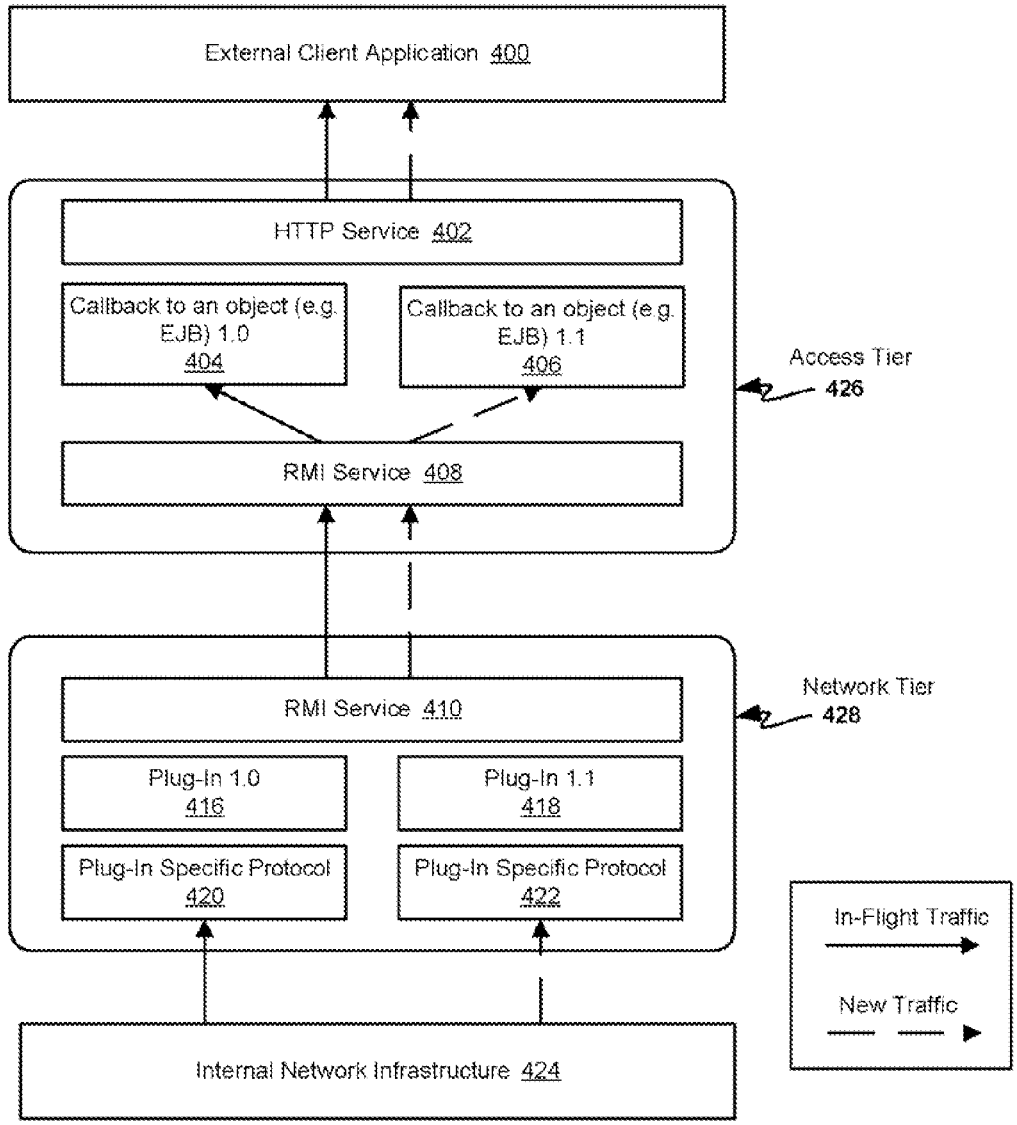
FIG. 2 is an illustration of northbound traffic during a hitless upgrade within the multiprotocol gateway, in accordance with various embodiments of the invention.

FIG. 2 is an illustration of northbound traffic during a hitless upgrade within the multiprotocol gateway, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the solid arrow lines represent in-flight traffic flow at the time of hitless deployment, while the broken lines represent new incoming traffic similarly to those shown in FIG. 1. In FIG. 2, however, the requests are northbound, i.e. they originate with at the mobile network 424 and are directed to the service provider application 400 which is external with respect to the network operator. For such northbound traffic, the requests are received at the multiprotocol gateway via a network-specific protocol 420, 422.

As shown in the figure, there are two versions of a plug-in, 1.0 (416) and 1.1 (418) within the network tier 428. The plug-in version 1.1 can take over processing new requests and older plug-in 1.0 can merely finish the in-flight processing before being deployed.

The communication between the network tier 428 and the access tier 426 can be implemented by using an RMI service 408, 410. Via the RMI service, the requests can make their way to the access tier, where they can be forwarded to the external application 400. As further shown in the figure, in the access tier, there can be multiple versions of the module that issues a callback to an object such as EJB 404, 406. It will be evident to one of ordinary skill in the art, that an EJB is shown for purposes of illustration only, and that the invocation from the network tier can be to any object implementing a particular interface. The communication between the access tier and the external application 400 can be implemented via an HTTP service 402.

Figure 3:
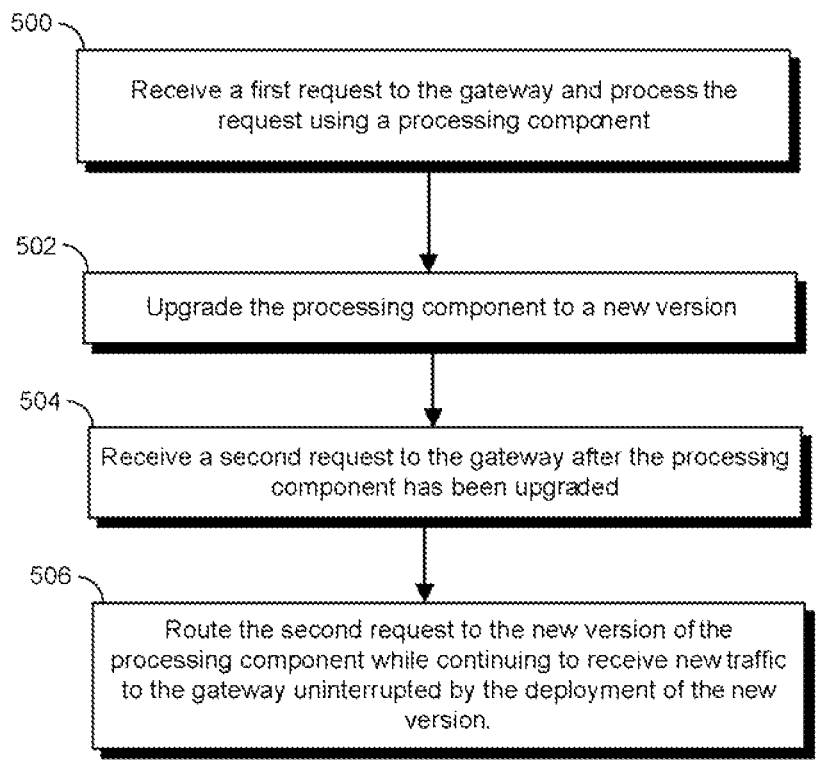
FIG. 3 is a high level flow chart diagram of the process for providing a production upgrade, in accordance with various embodiments of the invention.

FIG. 3 is a high level flow chart diagram of the process for providing a production upgrade, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As shown in step 500, at any given time, the multiprotocol gateway can be processing various requests. These requests are generally processed by numerous processing components (modules) within the gateway.

As shown in step 502, a processing component can be upgraded or modified by deploying a new version within the gateway. Thus, for at least a period of time, there are two functioning versions of the module processing within the multiprotocol gateway. Once a subsequent request is received to the gateway (step 504), the request can be directed to the new version of the module (step 506). The older module can finish servicing its requests and be undeployed. For example, the older version of the module can process those requests which are associated with an existing session that it was previously handling. Requests associated with new sessions can be routed to the new version of the module. Similarly, stateless requests which do not require any session can also be forwarded to the new version of the module.

Figure 4:
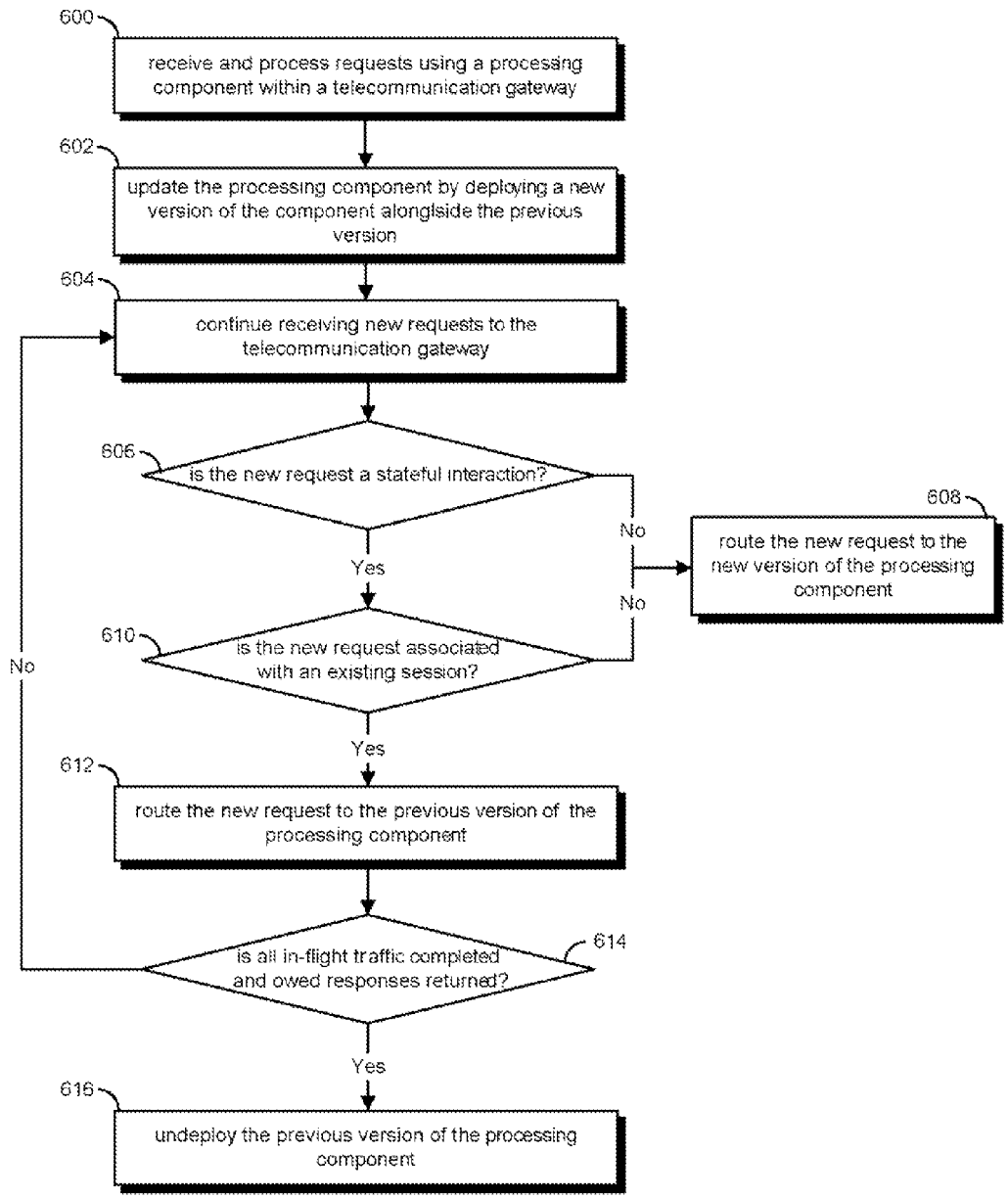
FIG. 4 is a flow chart diagram of the process for providing a production upgrade, in accordance with various embodiments of the invention.

FIG. 4 is a flow chart diagram of the process for providing a production upgrade, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As shown in step 600, requests can be received and processed by the communication multiprotocol gateway. During the processing of these requests, a module can be upgraded within the gateway, as shown in step 602. In step 604, new requests are continued to be received and processed without an interruption.

If the request is a stateless interaction (step 606), it can be directly routed to the new version of the module (step 608). If the request is stateful, it can be determined whether the stateful request is associated with an existing session, or whether it needs a new session to be created, as shown in step 610. If the request requires a new session, it can be directed to be processed by the new version of the module (step 608). If, on the other hand, the request is associated with an existing session, it can be directed to the previous version of the module (step 612) so as not to interrupt or affect existing traffic.

Once all of the in-flight traffic has been completed, the existing sessions time out and all of the owed responses are returned (step 614), the previous version of the gateway module can be un-deployed, as shown in step 616. Until this occurs, the previous version of the module can continue to process incoming requests as appropriate, as previously described.

Gateway

Figure 5:
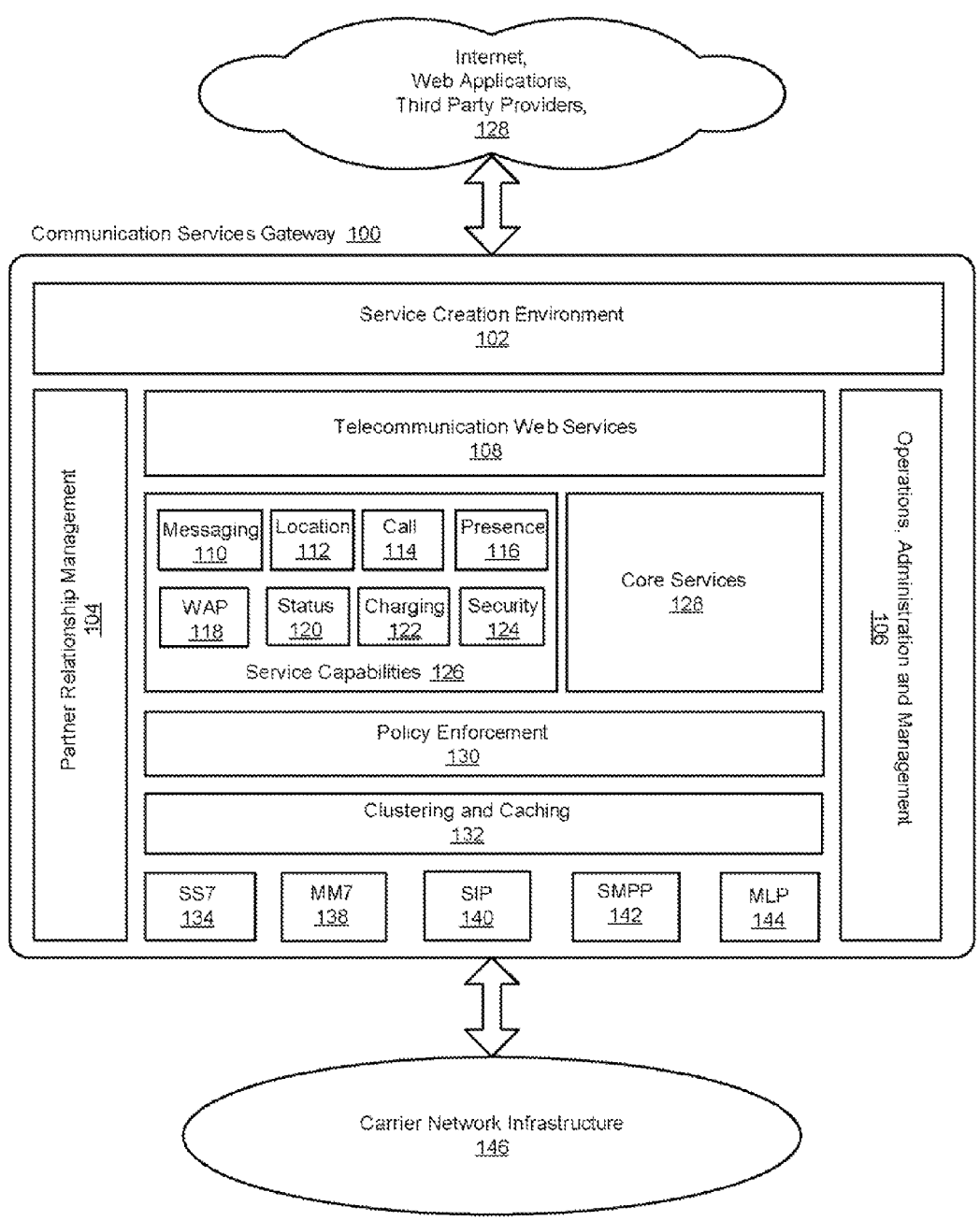
FIG. 5 is an illustration of a possible functionality of the multiprotocol gateway that can implement the production upgrade feature, in accordance with various embodiments of the invention.

FIG. 5 is an illustration of a possible functionality of the multiprotocol gateway that can implement the hitless upgrade feature, in accordance with various embodiments of the invention. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the multiprotocol gateway 100 can be deployed by a network operator in order to manage traffic flow to and from the telecommunications network 146. In other words, the gateway is an entity deployed between the internal network of the operator and any client and/or device 128 that wishes to access the network 146. In one embodiment, the multiprotocol gateway is a set of software applications that perform some services to the requests flowing to/from the network 146. In alternative embodiments, the gateway can be implemented as hardware, firmware, or any combination thereof. In either case, the gateway can translate communications initiated by clients (e.g. Web applications) via Web services into the appropriate network protocols and vice versa. For example, in one embodiment, the multiprotocol gateway exposes the following service enablers as telecommunication Web Services 108:

- Call Control (Parlay X), including Third-party call control, call notification and audio call;
- Messaging (Parlay X), including short messaging service (SMS), multimedia messaging service (MMS) and EWS wireless application protocol (WAP) push;
- Location (Parlay X), including MLP-based terminal location;
- Presence (Parlay X), including session initiation protocol (SIP)-based terminal status; and
- Subscriber Profile (Extended Web Services)—lightweight directory access protocol (LDAP)-based user profile.

On the carrier network side, the web services can be translated into protocols such as signaling system 7 (SS7) 134, MM7 138, session initiation protocol (SIP) 140, short message peer to peer protocol (SMPP) 142, MLP 144, and the like.

In addition to performing various protocol translations, the multiprotocol gateway 100 can provide an integrated service exposure platform that combines policy enforcement, comprehensive web services, partner relationship management, and an extensible network adaptation framework. The gateway can facilitate third party service provider 128 access to the carrier network 146 in a controlled, secure and optimized manner. It can also protect and manage third party access to the operator's core network resources, such as messaging 110, call control 114, location 112, subscriber profile.

The various features of the gateway can also include core services 128 (e.g. geo-redundancy, logging, etc.), clustering and caching 132, policy enforcement 130, third party relationship management 104, operations, administration and management 106, as well as service creation 102. The gateway can be deployed in a multi-tier environment that comprises an access tier and a network tier. The two-tier deployment will be described in further detail below, in conjunction with FIG. 6. In addition, the gateway can provide various service capabilities 126, such as messaging 110, location 112, call 114, presence 116, wireless application protocol (WAP) 118, status 120, charging 122 and security 124.

It is noted, however, that the above described features and services of the multiprotocol gateway are provided purely for purposes of illustration and are not intended to be limiting of the invention in any way. The particular set of features illustrated in FIG. 5 is only one example of many such sets that are possible and the multiprotocol gateway is not limited to this or other specific implementations.

Figure 6:
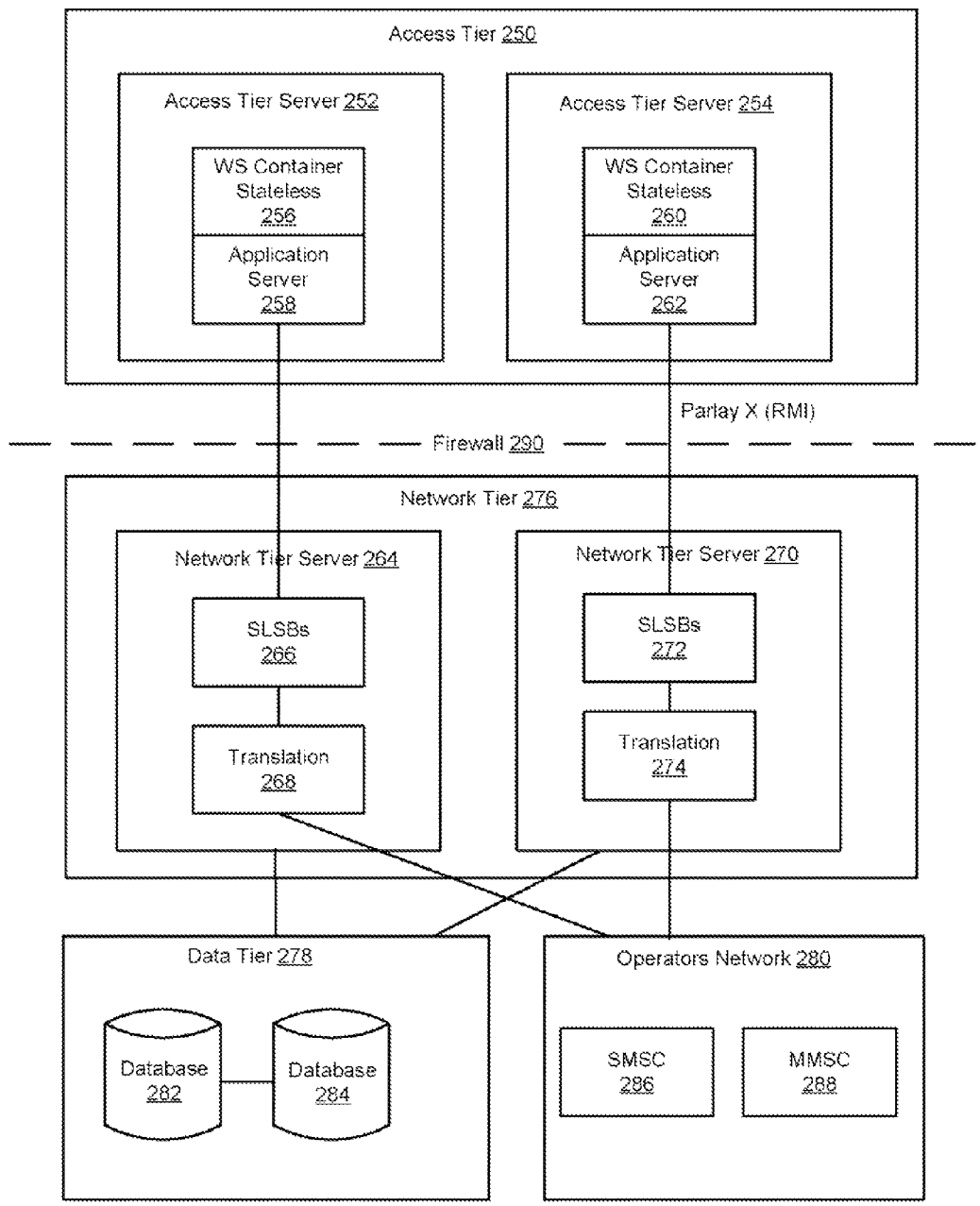
FIG. 6 is an illustration of a possible dual tier gateway deployment, in accordance with various embodiments of the invention.

FIG. 6 is an illustration of a possible dual tier gateway deployment, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the multiprotocol gateway can be deployed in two tiers—an access layer cluster and a network layer cluster having a firewall 290 in between. Each of these tiers can be upgraded independently of one another using the techniques described herein. The access tier 250 is the entry point for third party applications into the operator's network. The purpose of the access tier is to provide a first level of protection from malicious applications and other potential threats against the integrity of the operator's network. In one embodiment, the access tier can be distributed across multiple access tier servers 252, 254 having an application server software 258, 262 deployed thereon. The web services stateless container 256, 260 can be implemented on top of the application server, allowing the access tier to receive requests into the access tier.

The network tier 276, which integrates with the operator's network, is shielded from applications by the access tier 250. The communications between the access tier and the network tier can be over the Parlay X Web Services as remote method invocations (RMI). The network tier can be comprised of multiple network tier servers 264, 270. In one embodiment, stateless session beans (SLSBs) 266, 272 can be deployed on the network tier servers. In addition, the network tier can include the translation logic components 268, 274, for translating the communications into specific network protocols, as previously described.

Each tier can be scaled individually by adding new servers and can be upgraded independently by deploying new versions of modules within each tier. The deployment can additionally include a data tier 278 with databases 282, 284 or some other forms of persistent storage. Furthermore, the operator's network 280 typically provides a short messaging service center (SMSC) 286 and a multimedia messaging service center (MMSC) 288 to the various subscribers. The SMS center 286 and the MMS center 288 are responsible for handling the SMS operations and the MMS operations (respectively) of a wireless network. For example, when an SMS message is transmitted by a mobile phone, it reaches the SMS center 288, which can then forward the message to the recipient. In various embodiments, the main duties of the SMSC and the MMSC are to route various messages and to regulate the process.

In various aspects, the embodiments described throughout this disclosure encompass computer apparatus, computing systems and machine-readable media configured to carry out the foregoing methods to implement the production upgrade. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments also include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. In various embodiments, the transmission may include a plurality of separate transmissions.

In an embodiment the present invention includes a computer-readable medium carrying one or more sequences of instructions for providing production upgrades in a telecommunication processing environment, which instructions, when executed by one or more processors, cause the one or more processors to carry out the steps of: receiving a first request to the multiprotocol gateway; directing the first request to a component within the gateway; updating the component by deploying a new version of said component within the gateway; receiving a second request to the gateway, said second request received after the component has been updated; and routing the second request to the new version of said component and continuing to receive new traffic to the gateway uninterrupted by deployment of the new version of said component.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A method for providing a production upgrade of a component in a multiprotocol gateway, from an older version of the component, to a new version which includes modified functionality relative to the older version, the method comprising:

providing a multiprotocol gateway which executes on one or more processors, and which includes a plurality of components;

receiving a first request to the multiprotocol gateway, wherein the first request is directed to a particular component;

directing the first request to an older version of the component;

upgrading the component, by deploying a new version of the component alongside the older version within the gateway, and by providing a schema accessible to both versions, wherein the schema defines a structure of state information which is associated with the older version and consumed by the new version, so that the state information is simultaneously accessible by both versions, wherein the new version adds new attributes to the schema;

enforcing a service level agreement across multiple versions of a plug-in associated with the component, wherein a shared state is maintained across the multiple versions;

receiving a second request to the gateway, wherein the second request is received after the new version of the component has been deployed and while the older version of the component remains operational;

routing the second request to the new version of the component and continuing to receive new traffic to the gateway uninterrupted; and retiring the older version of the component when existing sessions using the older version are completed.

2. The method of claim 1, wherein updating the component is performed without impacting traffic flow in the gateway, such that the production upgrade is non-visible to external entities and clients interacting with the multi-protocol gateway.

3. The method of claim 1, wherein routing the second request to the new version of the component further includes:

determining whether the second request is associated with an existing session; and routing the second request to the older version of the component if the second request is associated with the existing session, otherwise routing the second request to the new version of the component.

4. The method of claim 1, further comprising:

receiving one or more new requests after the component has been updated;

determining whether the new requests are session-based stateful interactions or a stateless interactions; and routing the new requests directly to the new version of the component if the new requests are stateless interactions;

routing the new requests associated with existing sessions to the older version of the component if the new requests are stateful interactions; and routing the new requests associated with new sessions to the new version of the component.

5. The method of claim 1, wherein the schema is stored in a highly available storage that includes multiple versions to enable multiple components to access the storage.

6. The method of claim 5, wherein the new version of the component is configured to handle instances of the schema containing the state information with both null and non-null new attributes values.

7. The method of claim 1, wherein said multiprotocol gateway further includes:

at least two versions of a plug-in used to translate communications, wherein a single active version of the plug-in is accepting traffic and wherein the active version transitions to administrative state during the update of the component, such that the plug-in does not process traffic while being in the administrative state.

8. The method of claim 1, wherein the component is an exposure service that translates said request from one protocol to a different protocol.

9. The method of claim 1, wherein said multiprotocol gateway further includes:

an access tier; and a network tier;

wherein said access tier is upgraded while the network tier is sending northbound traffic and said network tier is upgraded while the access tier is sending southbound traffic; and wherein the access tier receives traffic from a first set of external clients and the network tier receives traffic from a second set of external clients in the telecommunications network.

10. The method of claim 1, wherein the component can be upgraded independently from other components within the gateway.

11. A system for providing a production upgrade in a multiprotocol gateway, the system comprising:

one or more processors;

a multiprotocol gateway which executes on the one or more processors, and which includes a plurality of components;

an older version of a component deployed to process telecommunications requests in the gateway;

a new version of the component deployed alongside the older version within the gateway, wherein the new version includes modified functionality with respect to the older version, and wherein the new version processes one or more new telecommunication requests contemporaneously with the older version such that traffic is continued to be received to the gateway uninterrupted;

a schema accessible to both versions, wherein the schema defines a structure of state information which is associated with the older version and, consumed by the new version, so that the state information is simultaneously accessible by both versions, wherein the new version adds new attributes to the schema, wherein the older version of the component is retired when existing sessions using the older version are completed;

a plug-in associated with the component, wherein the plug-in includes multiple versions, wherein a service level agreement is enforced, and a shared state is maintained across the multiple versions; and wherein the gateway determines whether a request is associated with an existing session and routes the request to the older version of the component if the request is associated with the existing session, and otherwise routes the request to the new version of the component.

12. The system of claim 11, wherein the older version of the component is upgraded to the new version of the component without impacting traffic flow in the gateway, such that the production upgrade is non visible to external entities and clients interacting with the multi-protocol gateway.

13. The system of claim 11, wherein the gateway:

receives one or more new requests after the new version of the component has been deployed, determines whether the new requests are session-based stateful interactions or stateless interactions; and routes the new requests directly to the new version of the component if the new requests are stateless interactions;

routes the new requests associated with existing sessions to the older version of the component if the new requests are stateful interactions; and routes the new requests associated with new sessions to the new version of the component.

14. The system of claim 11, wherein the schema is stored in a highly available storage that includes multiple versions to enable multiple components to access the storage.

15. The system of claim 14, wherein the new version of the component is configured to handle instances of the schema containing the state information with both null and non-null new attributes values.

16. The system of claim 11, further comprising: at least two versions of a plug-in used to translate communications, wherein a single active version of the plug-in is accepting traffic and wherein the active version transitions to administrative state during the update of the component.

17. The system of claim 11, wherein the component is an exposure service that translates said request from one protocol to a different protocol.

18. The system of claim 11, further comprising:

an access tier; and a network tier;

wherein said access tier is upgraded while the network tier is sending northbound traffic and said network tier is upgraded while the access tier is sending southbound traffic.

19. A non-transitory computer-readable storage medium carrying one or more sequences of instructions for providing production upgrades of an older version of a component to a new version in a telecommunication processing environment, which instructions, when executed by one or more processors, cause the one or more processors to carry out the steps comprising:

providing a multiprotocol gateway which includes a plurality of components;

receiving a first request to the multiprotocol gateway, wherein the first request is directed to a particular component;

directing the first request to an older version of the component;

upgrading the component, by deploying a new version of the component alongside the older version within the gateway, and by providing a schema accessible to both versions, wherein the schema defines a structure of state information which is associated with the older version and consumed by the new version, so that the state information is simultaneously accessible by both versions, wherein the new version adds new attributes to the schema;

enforcing a service level agreement across multiple versions of a plug-in associated with the component, wherein a shared state is maintained across the multiple versions;

receiving a second request to the gateway after the new version of the component has been deployed and while the older version of the component remains operational;

routing the second request to the new version of the component and continuing to receive new traffic to the gateway uninterrupted; and retiring the older version of the component when existing sessions using the older version are completed.

* * * * *

UNITED STATES PATENT AND TRADEMARK OFFICE
CERTIFICATE OF CORRECTION

| | | |
|---|---|---|
| PATENT NO. | : 8,863,111 B2 | Page 1 of 1 |
| APPLICATION NO. | : 12/493083 | |
| DATED | : October 14, 2014 | |
| INVENTOR(S) | : Selitser et al. | |

It is certified that error appears in the above-identified patent and that said Letters Patent is hereby corrected as shown below:

In the Claims

In column 11, line 31, in Claim 11, delete "and," and insert -- and --, therefor.

Signed and Sealed this
Twenty-eighth Day of April, 2015

Michelle K. Lee
*Director of the United States Patent and Trademark Office*